K. AND A. H. OLSSON.
CHANGE SPEED WHEEL GEAR FOR LATHES.
APPLICATION FILED SEPT. 22, 1919.
1,420,939.
Patented June 27, 1922.
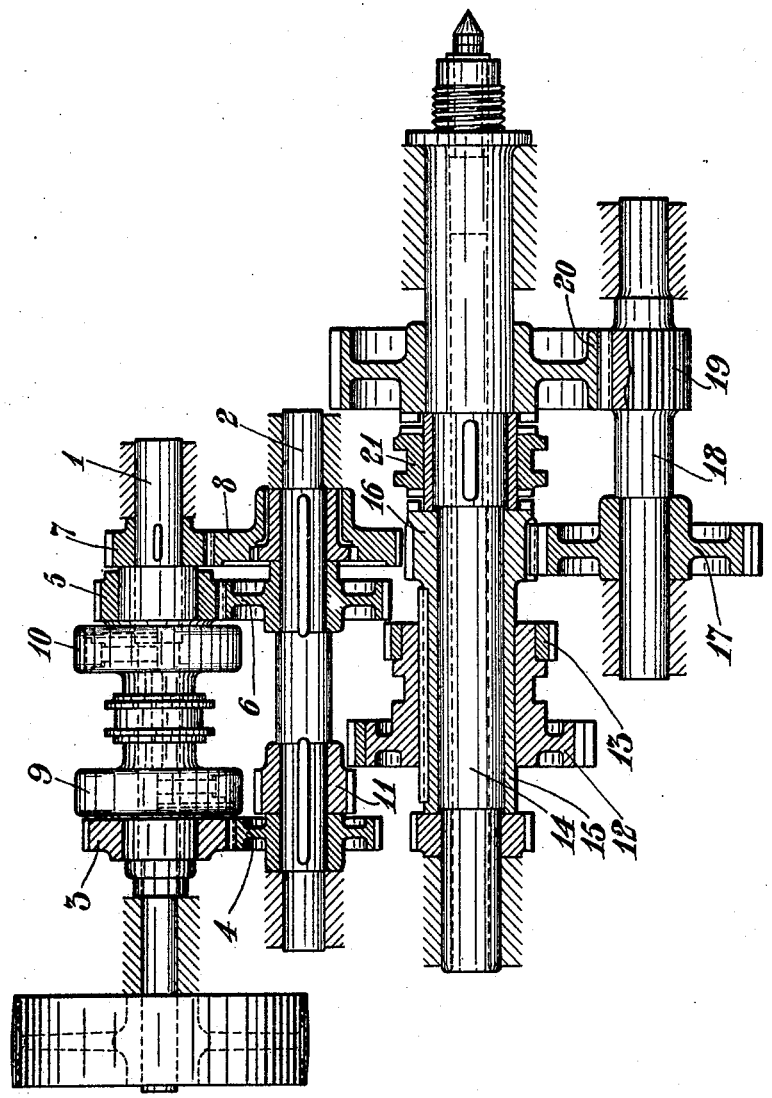
Inventors:
K. Olsson
A. H. Olsson
By H. R. Kerslake
Attorney.

UNITED STATES PATENT OFFICE.

KARL OLSSON AND ANDERS HILMER OLSSON, OF LIDKOPING, SWEDEN, ASSIGNORS TO AKTIEBOLAGET LIDKÖPINGS MEKANISKA VERKSTAD, OF LIDKOPING, SWEDEN, A CORPORATION.

CHANGE-SPEED WHEEL GEAR FOR LATHES.

1,420,939.  Specification of Letters Patent.  Patented June 27, 1922.

Application filed September 22, 1919. Serial No. 325,420.

*To all whom it may concern:*

Be it known that we, KARL OLSSON and ANDERS HILMER OLSSON, subjects of the King of Sweden, residing at Lidkoping, in the Kingdom of Sweden, have invented certain new and useful Improvements in Change-Speed Wheel Gears for Lathes, of which the following is a specification.

The present invention relates to a change speed-wheel gear for lathes by means of which a great number of spindle speeds can be obtained by the least possible number of change wheels with respect to the number of speeds and without the use of any step-up gearings. The operating devices for producing the various speeds, the mutual relationship of which is that of a geometrical series, are the simplest possible, besides which the whole arrangement occupies a very small space. All these advantages are of a great importance, particularly in high speed lathes.

The invention primarily consists therein that three gears with different ratios are driven from a shaft rotating with uniform speed, two of the said gears being adapted to be alternately brought in gear by means of a suitable contrivance, while the third gear is automatically brought in mesh by means of an automatic ratchet-gear when the two other gears are thrown out of mesh, the three gears coacting with two change gears mounted on the lathe spindle and adapted to be brought in mesh either directly or by means of an intermediate gear.

The accompanying drawing shows one embodiment of the invention.

From the shaft 1 rotating with uniform speed three speeds of revolution are transmitted to the shaft 2 by means of the gears 3—4, 5—6 and 7—8. The gears 3—4, 5—6 are brought in mesh alternately by means of the friction couplings 9 and 10, and the construction of the device is such that when the two gears 3—4, 5—6 are thrown out of mesh, the third gear 7—8 will be brought in action by means of an automatic ratchet-gear. The three speeds produced by the gears 3—4, 5—6 and 7—8 are transmitted from shaft 2 to the lathe spindle 14 by means of the gears 11—12 and 6—13. The wheels 12 and 13 are rigidly connected with one another and slidably but not rotatably mounted on a sleeve 15 which is rotatably fitted on the spindle and made integral with a toothed wheel 16 coacting with a toothed wheel 17 on a shaft 18. Attached to the shaft 18 is a toothed wheel 19 coacting with a toothed wheel 20 rotatably mounted on the spindle. A clutch-coupling-bush 21 is slidably but not rotatably arranged between the wheel 20 and the sleeve 16, which is also rotatably mounted on the spindle.

By alternately throwing gear 12 or 13 in mesh, three speeds of revolution corresponding to the gears 3—4, 5—6, 7—8 respectively may be transmitted to the spindle 14 through each of the said wheels 12 and 13, and thus six speeds can be obtained through both wheels. The said speeds are transmitted to the spindle directly by a displacement of the coupling bush 21 to the left into engagement with the sleeve 16, the movement being then transmitted from any of the wheels 12 or 13 to the sleeve 15 and thence to the coupling bush 21 and to the spindle 14. If, on the other hand, the bush 21 is moved to the right into engagement with the wheel 20, then the movement will be transmitted from one of the wheels 12 or 13 through sleeve 15, wheel 16, wheel 17, shaft 18, wheel 19 and wheel 20 to the spindle 14. Thus, in the latter coupling operation six speeds are also obtained, and consequently twelve speeds may be transmitted to the spindle by a change gear system containing only four shafts and 13 change wheels but no step-up gearings whatever, the said speeds being constituent parts of a geometric series.

The operating devices simply comprise three hand levers (not shown in the drawing), one of which is connected with the couplings 9 and 10, while the second is connected with the wheels 12 and 13 and the third with the coupling-bush 21.

What we claim as new and desire to secure by Letters Patent of the United States is:—

1. A change speed gear for lathes comprising a shaft, three pairs of gears with different ratios of gearing driven from said shaft, said shaft being adapted to rotate at a uniform speed, a coupling adapted to alternately connect two of said gears with said shaft, an automatic ratchet gear associated with the third pair of gears, change speed gears adapted to be alternately brought into mesh with certain of the first mentioned pairs of gear wheels, a driven shaft, and means for clutching the driven shaft with the change speed gears.

2. A change speed gear comprising a shaft, a plurality of pairs of gears with different ratios of gearing driven from said shaft, a coupling adapted to alternately connect two of said pairs of gears with said shaft, an automatic ratchet gear associated with another pair of said gears to establish a driving connection when the first mentioned gears are disconnected from said shaft, change speed gears adapted to alternately mesh with certain of the first mentioned pairs of gears, a driven shaft, and means for clutching said driven shaft with said change speed gears.

3. A change speed gear comprising a shaft, a plurality of pairs of gears with different ratios of gearing driven from said shaft, couplings adapted to alternately connect two said pairs of gears with said shaft, an automatic ratchet gear adapted to establish a driving connection between one of the gears of another of said pairs and a gear of one of the first mentioned pairs when the two first mentioned gears are disconnected from the shaft, change speed gears adapted to alternately mesh with certain of the first mentioned gears, an intermediate gearing connected with the change speed gears, a driven shaft associated with the change speed gears and the intermediate gearing, and means for alternately clutching said driven shaft with the change speed gear and intermediate gearing whereby the driven shaft may be driven either directly through the change speed gears or indirectly through the change speed gears and intermediate gearing.

In witness whereof we have hereunto set our hands in the presence of two witnesses.

KARL OLSSON.
ANDERS HILMER OLSSON.

Witnesses:
BENGT WESTERLUND,
G. EKHOLM.